Patented Jan. 6, 1925.

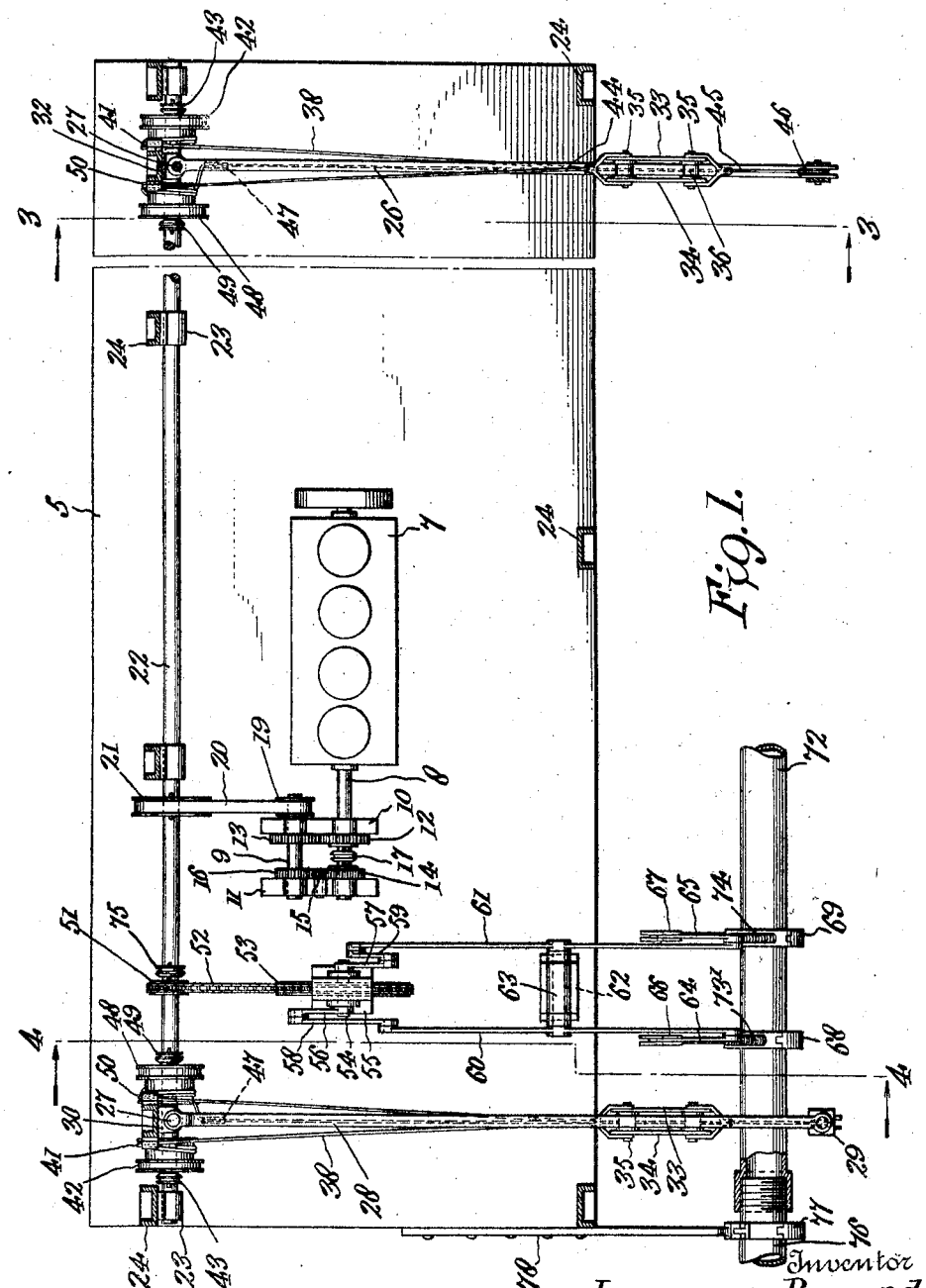

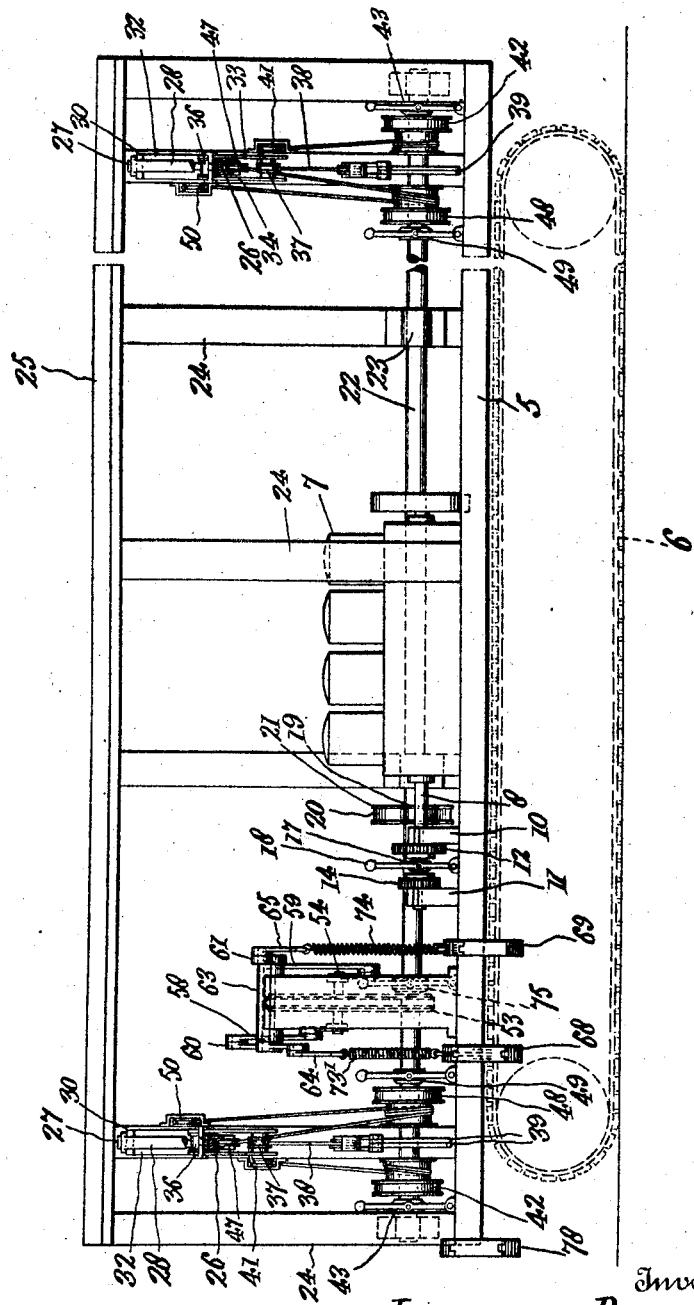

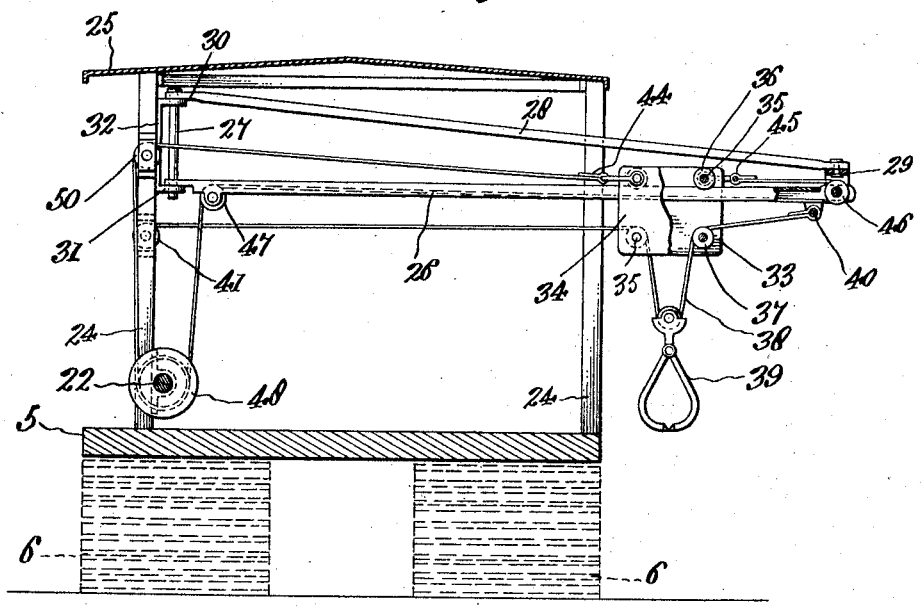
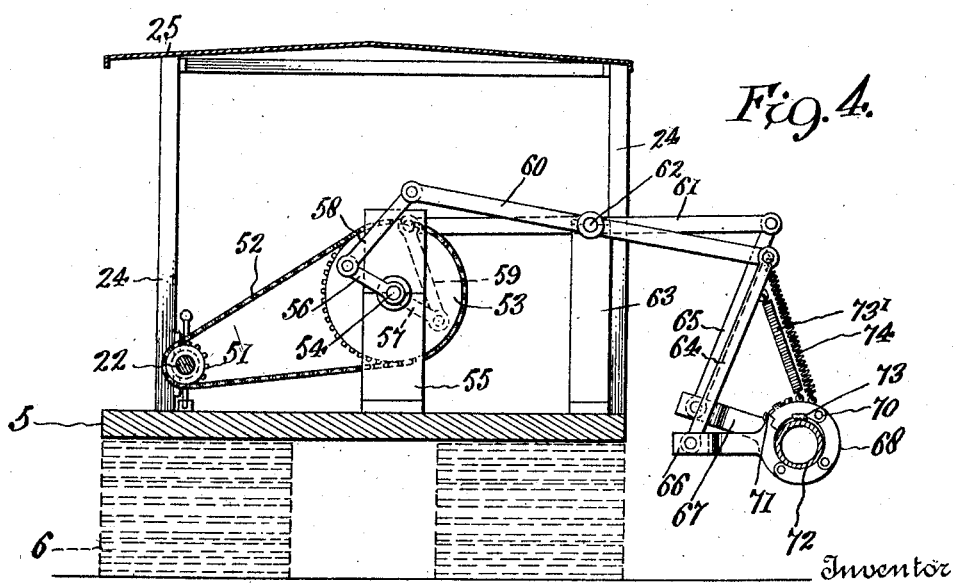

1,522,408

UNITED STATES PATENT OFFICE.

LAURENCE BAYARD, OF NEW IBERIA, LOUISIANA.

PIPE-LAYING MACHINE.

Application filed April 3, 1924. Serial No. 704,032.

*To all whom it may concern:*

Be it known that I, LAURENCE BAYARD, a citizen of the United States, residing at New Iberia, in the parish of Iberia and State of Louisiana, have invented certain new and useful Improvements in Pipe-Laying Machines; and I do hereby declare the following to be a full, clear, and exact description of the invention, such as will enable others skilled in the art to which it appertains to make and use the same.

The present invention relates to improvements in pipe laying machines, and has for an object to provide a portable machine adapted to install and take down pipe lines in oil fields and elsewhere, and for transferring sections of pipe from one place to another conveniently and efficiently with an elimination of a great deal of labor now required and found costly in such operations.

The invention aims to provide a machine, which provides for the raising and lowering of piping or pipe sections, and either the conveying of such material itself, or hauling the material in a trailer; the machine further providing means for turning sections of pipe for the purpose of unscrewing one section from another or for screwing the sections together for the purpose of assembling the pipe line.

A further object of the invention consists in providing a machine in which the various agencies will be compactly assembled and controllable from a central point.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view, with parts broken away, of an improved pipe laying machine constructed in accordance with the present invention.

Figure 2 is a side elevation, also with parts broken away, of the same.

Figure 3 is a transverse section taken on the line 3—3 in Figure 1, and

Figure 4 is a similar view taken on the line 4—4 also in Figure 1.

Referring more particularly to the drawings 5 designates a platform, which may be mounted for travel upon any suitable running gear, such, for instance, as the endless bands of chains indicated at 6 in dotted lines.

Centrally upon the platform is motor 7, which may be connected to drive the belts 6, and a transmission mechanism is associated with the power plant, which includes the engine shaft 8 and a counter shaft 9, these shafts being journalled in appropriate bearings 10 and 11 installed on the platform. The gears 12 and 13 respectively upon the drive shaft 8 and the counter shaft 9 are provided for communicating a rotary movement to the counter shaft in one direction, while the other gears 14, 15 and 16 provide for driving the counter shaft 9 in an opposite direction. The gear wheels 12 and 14 are provided with clutch faces to cooperate with either side of the movable clutch collar 17, which is keyed to the engine shaft 8 so as to rotate therewith, but having a longitudinally or axially sliding movement. As shown in Figure 2, a lever 18 may be employed to shift the clutch collar 17 into engagement with either gear wheel in accordance with the direction of the movement desired.

The counter shaft 9 carries a pulley 19 engaged by a belt 20, which is fitted over a second pulley 21 upon the main drive shaft 22, which extends substantially the length of the platform 5, and is located to one side thereof, being journalled in the bearings 23 near the lower ends of the channel standards 24, which support the roof 25. These standards are spaced apart, and located at suitable intervals upon the platform 5 so as to provide an adequate support for the roof and also for mounting the various other parts.

The drive shaft 22 provides for operating tongs near both ends of the platform for the purpose of raising and lowering the pipe, and has an additional function for operating mechanism to rotate the pipe sections relatively to one another for the purpose of screwing and unscrewing the same.

In Figure 3, I have illustrated one of the devices for raising and lowering the pipe, which consists in a substantially horizontal arm 26 pivoted for a horizontal swinging movement upon the pin 27 and cooperating with the diagonal upper bar 28 pivoting in a similar manner upon the pin 27 at its inner end, and being riveted or otherwise secured to a piece 29 upon the outer free end of the horizontal arm 26.

The pin 27 is fitted through the outwardly turned ends 30 and 31 of a bracket 32 secured to one of the standards 24, these bent ends of the bracket forming supports for the arms 26 and 28. The arm 26 provides a rail for a travelling carriage, comprising the plates 33 and 34 secured together by the pins 35 upon pairs of upper and lower rollers 36 and 37, which are mounted between the plates, the upper pair of rollers 35 serving to support the carriage for rolling movement upon the upper side of the arm 26, while the lower rollers 37 provide for receiving the cable 38, which supports the pipe tongs 39. The outer end of the cable 38 is affixed, as indicated at 40, to a bracket on the arm 26, while the opposite portion of the cable passes about a pulley 41 and extends downwardly to a drum 42, about which it is wound. The drum runs loose about the drive shaft 22, and a movable clutch collar 43 is associated with the drum for the purpose of coupling the drum to the drive shaft when it is necessary to either elevate or lower the tongs 39.

The opposite ends 44 and 45 of a cable are secured to the carriage, one end portion of the cable extending out and around a roller 46 at the outer end of the arm 26, and being carried beneath the arm to a second roller 47 at the inner under side of the arm, from which point the cable is carried down to a drum 48, also running loose upon the drive shaft 22, and having a clutch collar 49 associated therewith. The other end 44 of the cable extends above the arm 26, from a roller 50 and down to the opposite side of the drum 48 so that by movement of the drum in one direction the carriage 33 is advanced outwardly and upon movement of the drum in the other direction, such carriage is drawn inwardly to the platform.

Referring more particularly to Figure 4, the drive shaft 22 is provided adjacent one of the tong arms with a sprocket 51 engaged by a chain 52. This chain extends about and engages the teeth of a larger sprocket 53 fixed to a shaft 54, journalled in the brackets 55 adjoining the transmission mechanism. The shaft 54 carries crank arms 56 and 57 to which are pivotally coupled the links 58 and 59. A pair of levers or rocker arms 60 and 61 are pivoted at their inner ends to the upper ends of the links 58 and 59 respectively, and such levers are fulcrumed centrally, as indicated at 62, upon a pedestal 63, mounted near the forward edge of the platform. The levers 60 and 61 project to a considerable extent beyond the forward edge of the platform 5, and are pivoted to downwardly extending links 64 and 65, which are, in turn, at their lower ends pivotally coupled to the arms 66 and 67, which carry the clutch collars 68 and 69. These clutch collars are made up of a number of sections pivoted together as indicated at 70, and having appropriate means, indicated generally at 71, for securing and locking the collars together about a section of pipe, indicated at 72. The collars are also provided with blocks 73 fitted removably upon their inner circular edges, and having inclined teeth so that rotary movement of the collars in one direction will cause the teeth to slip over the smooth surface of the pipe 72, it being understood that the inner diameter of the collars is slightly greater than the outer periphery of the pipe, while movement in the opposite direction will cause the teeth to bite into the pipe, and cause it to positively rotate. It will be noted that these collars are mounted as shown in Figure 1 in pairs at spaced points so that they grip the pipe at two remote points. Furthermore, by an inspection of Figure 4, it will be noted that the arms 66 and 67, by the power which is transmitted to rotate the clutch collars, are separated by a substantially angular distance. Coil springs 73′ and 74 are coupled between each clutch collar and the upper portion of its respective link 64 or 65. The spring 73′ is shown in Figure 4 as being contracted owing to the relative angular position of link 64 and arm 66; but the spring 74 is distended, owing to the larger angle existing at the point between the link 65 and its arm 67. These coil springs sustain the collars normally when the pipe is not fitted therein, and serve to sustain both the collars and the pipe when the pipe has been fitted therethrough, and the springs subserve the further function of supporting the relatively heavy collars and counterbalancing these collars so that the operator conveniently and quickly places the link sections of the collars about the pipes. As shown in Figure 1 at 75, a clutch mechanism is also provided in conjunction with the sprocket 51 for the purpose of engaging and disengaging the pipe rotating mechanism.

In the operation of the device, the machine is driven on location, and the pipe may be raised and lowered by means of the tongs 39. For instance, pipe to be transposed from one place to another, may be lifted by the tongs 39 to the platform 5 or on to a trailer carried by the machine. When the destination is arrived, this pipe is lowered by the tongs, and for this purpose the carriage 33 may be moved upwardly and outwardly, as controlled by the cables attached thereto.

In Figure 1, there is shown screwed into the end of the pipes 72 a companion section of pipe 76, which companion section of pipe is secured against turning by the use of a clutch collar 77, similar to the collars 68 and 69 and held by a fixed arm 78 from the platform 5. The purpose is to hold the companion pipe 76 while the clutch collar 68 and 69 turn the pipe section 72 and screw it off the pipe section 76. The clutch collars 68 and 69 leave a limited axial movement with respect to the pipe section 72 because of the remoteness of the fulcrum 62, which is the nearest point of fixed connection. This axial movement in the collars permits the pipe section 72 to back off the pipe section 76 in a longitudinal direction. One of the clutch collars is free of the pipe section 72, while the other collar has the teeth of the block 73 in binding engagement therewith, it being understood that these collars are oscillated by the rocking levers 60 and 61, and that when moved in one direction, the collars turn the pipe, but when moving in the other direction, the collars are free of the pipe. The power arms 66 and 67 are in off-set relation so that, as one collar is returning to initial position, the other is turning pipe 72 and the pipe is sliding axially through the free collar. This axial movement of the pipe is only a small one as the collars turn the pipe only a fraction of a revolution at each application of power so that the longitudinal movement of the collars is very slight and these collars regain their initial position by reason of the resiliency of the metal arms and links.

It is obvious that various changes and modifications may be made in the details of construction and design of the above specifically described embodiment of this invention without departing from the spirit thereof, such changes and modifications being restricted only by the scope of the following claims:—

What is claimed is:

1. A machine of the character described, comprising a platform mounted for movement, a motor thereon, a drive shaft journalled on the platform, a transmission mechanism for driving the shaft from the motor in either direction, swinging arms substantially at the ends of the platform, carriages traveling on said arms, tongs supported for raising and lowering movement from said carriages, and means for shifting said tongs and said carriages individually by movement derived from said drive shaft.

2. A machine of the character described, comprising a movable platform, a motor thereon, a drive shaft adjoining the motor, a transmission for driving said shaft in either direction, swinging arms substantially at the ends of the platform, a traveling carriage on each arm, tongs supported from said carriages, cables for raising and lowering said tongs, other cables for shifting said carriages back and forth on the arms, and drums for receiving said cables and adapted to be driven from said drive shaft.

3. A machine of the character described, comprising a movable carriage, a motor thereon, a drive shaft adapted to be driven by the motor in either direction, means on the platform for holding a section of pipe against turning movement, spaced collars having limited axial movement embracing at spaced points a companion section of pipe to be rotated relatively to the first section, said collars having inclined gripping means therein for engaging the pipe only for rotation in one direction, rocking levers coupled to oscillate said collars, said collars being oscillated in relatively reverse directions, and connections whereby said levers are rocked from said drive shaft.

4. A machine of the character described, comprising a platform, a motor thereon, a drive shaft coupled to the motor, a crank shaft driven from said drive shaft, a pair of levers fulcrumed substantially centrally, and coupled to the cranks of said crank shaft, links pivoted to the outer ends of the levers, arms pivoted to the lower ends of said links, sectional collars adapted to fit about a pipe section at spaced points fixed to said arms, said collars having inclined teeth to catch in the pipe on rotation in one direction only, said cranks, levers and associated parts being mounted in relatively off-set relation, and springs between the collars and the upper portions of said links.

LAURENCE BAYARD.